(12) United States Patent
Nose et al.

(10) Patent No.: US 7,167,168 B2
(45) Date of Patent: Jan. 23, 2007

(54) DISPLAY DEVICE AND METHOD FOR DRIVING DISPLAY DEVICE

(75) Inventors: Masaki Nose, Kawasaki (JP); Junji Tomita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 484 days.

(21) Appl. No.: 10/828,056

(22) Filed: Apr. 20, 2004

(65) Prior Publication Data

US 2004/0196230 A1    Oct. 7, 2004

Related U.S. Application Data

(63) Continuation of application No. PCT/JP02/13120, filed on Dec. 16, 2002.

(30) Foreign Application Priority Data

Dec. 27, 2001    (JP)    ............................. 2001-396068

(51) Int. Cl.
    *G09G 3/36*    (2006.01)
(52) U.S. Cl. .................. 345/204; 345/95; 345/205; 345/206; 345/210; 345/211; 315/169.1; 349/33
(58) Field of Classification Search ................ 345/51, 345/52, 87, 90, 95, 204, 205, 206, 210, 211; 315/169.1; 349/33
    See application file for complete search history.

(56) References Cited

U.S. PATENT DOCUMENTS

| | | | |
|---|---|---|---|
| 4,239,345 A | 12/1980 | Berreman et al. | ........... 350/331 |
| 5,828,357 A * | 10/1998 | Tamai et al. | ................... 345/89 |
| 5,977,940 A * | 11/1999 | Akiyama et al. | .............. 345/94 |
| 6,072,454 A * | 6/2000 | Nakai et al. | ................... 345/97 |
| 6,232,942 B1 * | 5/2001 | Imoto et al. | ................... 345/97 |

FOREIGN PATENT DOCUMENTS

| | | |
|---|---|---|
| EP | 0 018180 | 10/1980 |
| EP | WO 92/19695 | 11/1999 |
| JP | 55-142318 | 11/1980 |
| JP | 06-507505 | 8/1994 |
| JP | 11-237644 | 8/1999 |
| WO | WO 03/056382 | 7/2003 |

* cited by examiner

*Primary Examiner*—Bipin Shalwala
*Assistant Examiner*—Vincent E. Kovalick
(74) *Attorney, Agent, or Firm*—Greer, Burns & Crain, Ltd.

(57) ABSTRACT

A display device comprising an electrode 12, an electrode 16 and a liquid crystal layer 18 which is formed between the electrode 12 and the electrode 16 and change a display state corresponding to a voltage applied between the electrode 12 and the electrode 16, the display device further comprises a piezoelectric element 24 for producing a drive voltage signal which abruptly increases up to a prescribed voltage value and then gradually attenuates, a phase difference generating circuit 26 which, from the drive voltage signal produced by the piezoelectric element 24, generates and outputs a first voltage signal and a second voltage signal having a phase difference from the first voltage signal. The first voltage signal is applied to the electrode 12, and the second voltage signal is applied to the electrode 16. Thus, the orientation state of the chiral nematic liquid crystal can be changed without using an expensive electric power source.

14 Claims, 11 Drawing Sheets

DISPLAY DEVICE AND METHOD FOR DRIVING DISPLAY DEVICE

CROSS REFERENCE TO RELATED APPLICATIONS

This application is a Continuation of International Application No. PCT/JP02/13120, with an international filing date of Dec. 16, 2002, which designated the United States.

TECHNICAL FIELD

The present invention relates to a display device and a method for driving the display device, more specifically a reflective display device and a method for driving the reflective display device.

BACKGROUND ART

Generally, CRTs and transmissive liquid crystal displays with back lights are used in the display devices of computers and mobile devices. The displays of this type are the so-called emissive displays.

Based on recent studies, it is proposed to preferably use non-emissive reflective display devices in terms of work efficiency and wear in reading displays of texts, etc. The reflective display device, which requires no internal emission means and uses natural light, etc. for display, is good for eyes and effective to decrease the electric power consumption.

To realize further lower electric power consumption, a display device having the memory to retain displays even when the source power is turned off is expected.

As such display device is proposed a display device using a cholesteric liquid crystal. One typical cholesteric liquid crystal is chiral nematic liquid crystal. Chiral nematic liquid crystal is a liquid crystal comprising a nematic liquid crystal and a chiral reagent added to the nematic liquid crystal. Cholesteric liquid crystals typically represented by chiral nematic liquid crystal have a characteristic of reflecting selectively light of specific wavelengths.

The structure of the display device using chiral nematic liquid crystal will be explained with reference to FIG. 9. FIG. 9 is a diagrammatic view of the display device using chiral nematic liquid crystal.

As shown FIG. 9, an electrode of ITO (Indium-Tin-Oxide) is formed on a substrate 100 of glass. A photoabsobing layer 101 is formed on the back side of the substrate 100.

A substrate 104 of glass is disposed above the substrate 100 with the electrode 102 formed on, opposed to the substrate 100. An electrode 106 of ITO is formed on the side of the substrate 104, which is opposed to the electrode 102.

A liquid crystal layer 108 of chiral nematic liquid is formed between the substrates 100, 104 opposed to each other. The outer periphery of the liquid crystal layer 108 between the substrates 100, 104 is sealed with a seal compound 110 for preventing the leakage of the liquid crystal of the liquid crystal layer 108.

A display device using chiral nematic liquid crystal is disclosed in, e.g., Japanese Translation of PCT International Application No. Hei 06-507505 (1994).

Chiral nematic liquid crystal can be changed, by the application of voltages, etc., between the planer state, in which chiral nematic liquid crystal reflects that of incident light, which has a specific wavelength, and the focal conic state, in which chiral nematic liquid crystal transmits incident light.

FIG. 10A shows the planer state of chiral namatic liquid crystal. The helical axes of the liquid crystal molecules are perpendicular to the electrodes 102, 106.

In the planer state, light of a wavelength corresponding to a helical pitch of the liquid crystal molecules is reflected. The reflected wavelength can be set at a prescribed value by suitably setting an amount of the chiral reagent to be added to nematic liquid crystal to thereby change the helical axes of the liquid crystal molecules.

A wavelength $\lambda$ which gives a maximum reflectance spectrum is given by the following formula $$\lambda = n \cdot p$$

wherein an average refractive index of the liquid crystal is represented by n, and a helical pitch of the liquid crystal molecules is represented by p.

It is known that a band $\Delta\lambda$ of the reflected light is larger as the refractive index anisotropy $\Delta n$ of the liquid crystal is higher.

FIG. 10B shows the focal conic state of chiral nematic liquid crystal. The helical axes of the liquid crystal molecules 112 are parallel with the electrodes 102, 106.

Such arrangements of the liquid crystal are controlled to change by the application of voltages, whereby the reflective display device can be realized.

The planer state and the focal conic state are retained substantially permanently as long as no external force is applied. Accordingly, the use of chiral nematic liquid crystal makes it possible to provide a display device which can have memory of retaining display contents even when the source power is turned off.

As described above, chiral nematic liquid crystal can form reflective display devices and can retain display contents even when the source power is turned off, whereby the display devices of chiral nematic liquid crystal are noted as the next generation display device.

The method for driving the display device using the above-described chiral nematic liquid crystal will be explained with reference to FIGS. 9 to 11. FIG. 11 is views explaining the method for driving the display device using chiral nematic liquid crystal.

When a voltage is applied between the electrodes 102, 106 of the display device, the liquid crystal molecules of the liquid crystal layer 108 have a characteristic alignment corresponding to a strength of an electric field generated between the electrodes 102, 106, etc.

As shown in FIG. 11A, when a strong electric field is applied between the electrodes 102, 106, the helical structure of the liquid crystal molecules of the liquid crystal layer 108 is completely undone into homeotropic state, in which the liquid crystal molecules are aligned in the direction of the electric field. In homeotropic state, incident light on the liquid crystal layer 108 is transmitted without being reflected on the liquid crystal molecules of the liquid crystal layer 108. The incident light transmitted by the liquid crystal layer 108 is absorbed by the photoabsorbing layer 101 formed on the back side of the substrate 100.

Then, as shown in FIG. 11A, in the homeotropic state, when the electric field between the electrodes 102, 106 is abruptly removed, the helical axes of the liquid crystal molecules become perpendicular to the electrodes 102, 106. Resultantly, the chiral nematic liquid crystal becomes the planer state, which reflects selectively that of the incident light, which has a specific wavelength corresponding to a helical pitch of the liquid crystal molecules (see FIG. 10A).

On the other hand, as shown in FIG. 11B, when a weak electric field which can only undo the helical axes of the liquid crystal molecules is applied between the electrodes 102, 106 and removed, the helical axes of the liquid crystal molecules become parallel with the electrodes 102, 106. Resultantly, the chiral nematic liquid crystal becomes the focal conic state, which transmits the incident light (see FIG. 10B).

Similarly, as shown in FIG. 11C, when a strong electric filed is applied between the electrodes and gradually removed, the chiral nematic liquid crystal becomes the focal conic state, which transmits the incident light (see FIG. 10B).

When an electric field of a middle strength is applied between the electrodes 102, 106 and abruptly removed, the liquid crystal becomes a state mixing the planer state and the focal conic state, and displays of halftone can be made.

To form a reflective display device using chiral nematic liquid, the orientation state of the liquid crystal must be controlled to change to the planer state or to the focal conic state. To control the orientation state of the liquid crystal, as described above, it is necessary to apply a high voltage between the electrodes and abruptly remove the applied voltage. Accordingly, an expensive electric power source must be used.

Accordingly, a device and a method which can change the orientation state of chiral nematic liquid crystal even with an inexpensive electric power source have been required.

DISCLOSURE OF INVENTION

An object of the present invention is to provide a display device and a method for driving the display device which can change the orientation state of chiral nematic liquid crystal even without an expensive electric power source.

The above-described object is achieved by a display device comprising a first electrode, a second electrode, and a display layer which is formed between the first electrode and the second electrode and changes a display state corresponding to a voltage applied between the first electrode and the second electrode, the display device further comprising: a voltage signal producer producing a drive voltage signal which abruptly increases up to a prescribed voltage value and then gradually attenuates; and phase difference generator outputting a first voltage signal and a second voltage signal having a phase difference from the first voltage signal, based on the drive voltage signal produced by the voltage signal producer, the first voltage signal being applied to the first electrode, and the second voltage signal being applied to the second electrode.

The above-described object is achieved by a method for driving a display device comprising a fist electrode, a second electrode, and a display layer which is formed between the first electrode and the second electrode and changes a display state corresponding to a voltage applied between the first electrode and the second electrode, comprising the steps of: producing a drive voltage signal which abruptly increases up to a prescribed voltage value and then gradually attenuates; dividing the drive voltage signal to generate a first voltage signal, and a second voltage signal having a phase difference from the first voltage signal; and applying the first voltage signal to the first electrode and the second voltage signal to the second electrode.

The above-described object is achieved by a method for driving a display device comprising a first electrode, a second electrode, and a display layer which is formed between the first electrode and the second electrode and changes a display state corresponding to a voltage applied between the first electrode and the second electrode, comprising the steps of: producing a drive voltage signal which abruptly increases up to a prescribed voltage value and then gradually attenuates; dividing the drive voltage signal to generate a first voltage signal, and a second voltage signal having a phase difference from the first voltage signal, and applying the first voltage signal to the first electrode and the second voltage signal to the second electrode to thereby change the display layer to a first display state; and applying the drive voltage signal to the first electrode or the second electrode to thereby change the display layer to a second display state.

According to the present invention, for driving a display device comprising a first electrode, a second electrode, and a display layer which is formed between the first electrode and the second electrode and changes a display state corresponding to a voltage applied between the first electrode and the second electrode, a drive voltage signal which abruptly increases up to a prescribed voltage value and then gradually attenuates is produced, the drive voltage signal is divided to generate a first voltage signal and a second voltage signal having a phase difference from the first voltage signal, the first signal is applied to the first electrode, and the second signal is applied to the second electrode, whereby a high voltage can be applied between the first electrode and the second electrode, and the applied voltage can be abruptly removed. Thus, the display state of the display layer can be easily changed without using an expensive electric power source.

BEST MODE FOR CARRYING OUT THE INVENTION (The Principle of the Present Invention)

First, the principle of the present invention will be explained with reference to FIGS. 1 and 2.

To control the orientation state of chiral nematic liquid crystal it is necessary to apply a high voltage between electrodes and abruptly remove the applied voltage. To this end, it has been conventionally necessary to use expensive electric power sources.

As an element which can easily generate high voltages, a piezoelectric element is known. The piezoelectric element is an inexpensive element which is used in so various devices, such as lighters, gas stoves, etc. Furthermore, the piezoelectric element can easily generate high voltages which are required to change the orientation state of chiral nematic liquid crystal. If the piezoelectric element can be used as the electric power source for applying a voltage between the electrodes, the reflective display device of chiral nematic liquid crystal can be inexpensively fabricated.

However, it has been difficult to operate the display device using chiral nematic liquid crystal suitably in the following manner only by applying a voltage between the electrodes of the display device by the use of the piezoelectric element.

The case of applying a voltage between the electrodes of the display device by using the piezoelectric element will be explained with reference to FIG. 1. FIG. 1 is a graph of the inter-electrode voltage characteristics given when a voltage is applied between the electrodes by the piezoelectric element. The voltage characteristics shown in FIG. 1 were given when a voltage was applied with one of the electrodes of the display device connected to the piezoelectric device and with the other of the electrodes grounded.

Figure 1:
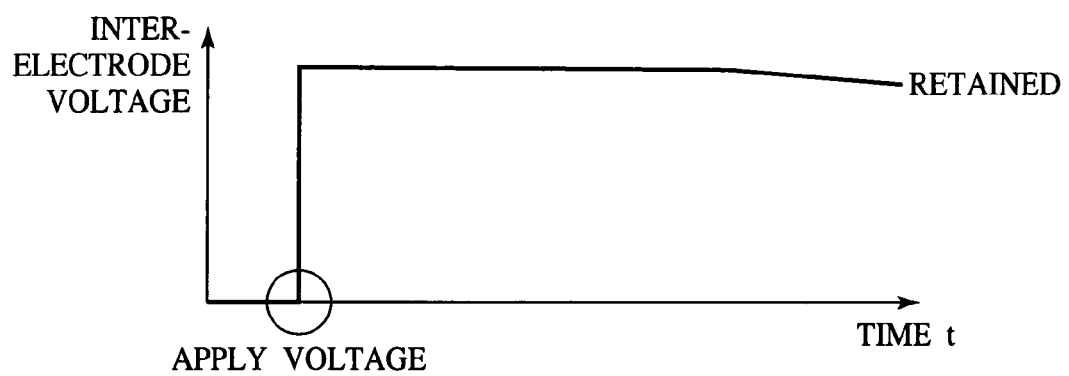
FIG. 1 is a graph of the voltage characteristics of the display device when a voltage is applied between the electrodes by the piezoelectric element.

When the piezoelectric element is driven, and a voltage is applied between the electrodes, as shown in FIG. 1, an electric field is abruptly generated between the electrodes and is retained for a while. The electrodes of a display device are equivalent to the condensers, and it takes considerable time for a voltage between the electrodes to become null. The chiral nematic liquid crystal of the liquid crystal layer for this while is in the homeotropic state. Accordingly, the chiral nematic liquid crystal of the liquid crystal layer transmits the incident light.

The voltage between the electrodes applied by the piezoelectric element is retained for a while. However, the voltage is gradually attenuated with progress of time and then disappears. As a result of the gradual disappearance of the electric field between the electrodes, the chiral nematic liquid crystal of the liquid crystal layer becomes the focal conic state. Accordingly, the chiral nematic liquid crystal of the liquid crystal layer transmits the incident light to the liquid crystal layer in the same way as in the homeotropic state.

As described above, only the application of a voltage between the electrodes by using the piezoelectric element can abruptly apply a high voltage but cannot abruptly remove the voltage between the electrodes. Accordingly, the chiral nematic liquid crystal of the liquid crystal layer cannot be changed to the planer state and cannot reflect that of the incident light, which has a specific wavelength. That is, only the use of the piezoelectric element as the electric power source for applying a voltage between the electrodes cannot realize the selective reflection by the chiral nematic liquid crystal.

In the present invention, a voltage signal as shown in FIG. 1 produced by the piezoelectric element is divided into two signals, a phase difference is given to them, and the two voltage signals having a phase difference are applied respectively to the electrodes, whereby a state in which the voltage between the electrodes has been abruptly removed is produced. Thus, even in the case that the piezoelectric element is used as the electric power source for applying a voltage between the electrodes, the chiral nematic liquid crystal can be changed to the planer state. Accordingly, without the necessity of using an expensive electric power source unit but with the use of an inexpensive piezoelectric element, the reflective display device using chiral nematic liquid crystal can be constituted.

The principle of the method for driving the display device according to the present invention will be explained with reference to FIG. 2. FIG. 2 is views explaining the principle of the method for driving the display device according to the present invention.

First, a voltage signal which abruptly increases up to a prescribed voltage value and then gradually attenuates is produced by the piezoelectric element.

Then, the voltage signal produced by the piezoelectric element is divided into two signals, and a phase difference is given to them.

Figure 2A:
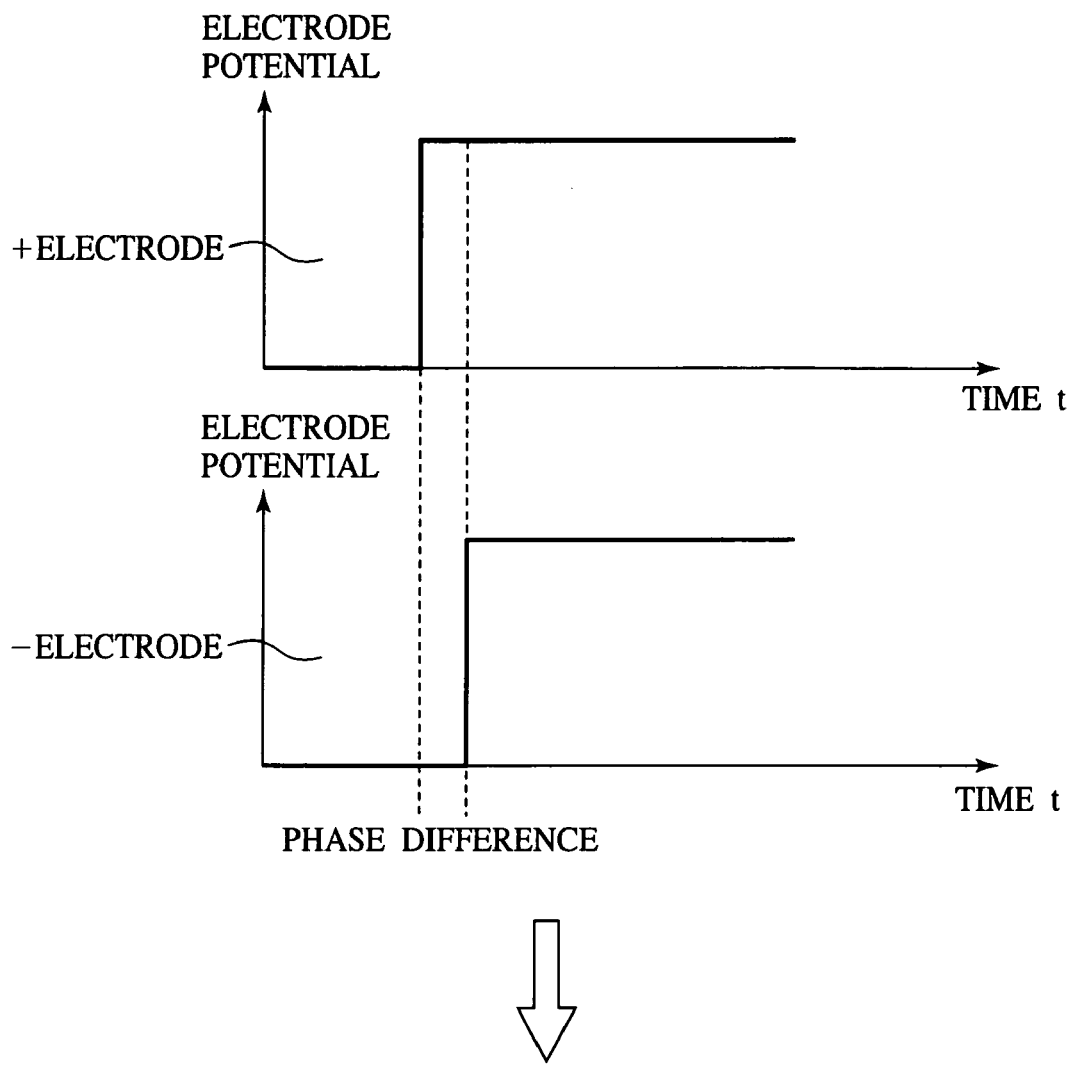
FIGS. 2A and 2B are views explaining the principle of the method for driving the display device according to the present invention.

Next, that of the two voltage signals divided and given the phase difference, which has the advanced phase is applied to one of the electrodes, and the voltage signal whose phase is delayed is applied to the other electrode. FIG. 2A shows the waveform of the voltage signal of the advance phase to be applied to the + electrode of the display device, and the waveform of the voltage of the delayed phase to be applied to the − electrode.

Then, a potential difference between the electrodes is abruptly increased due to a potential increase of the electrode to which the voltage signal of the advance phase has been first applied. Thus, the chiral nematic liquid becomes the homeotropic state.

Figure 2B:
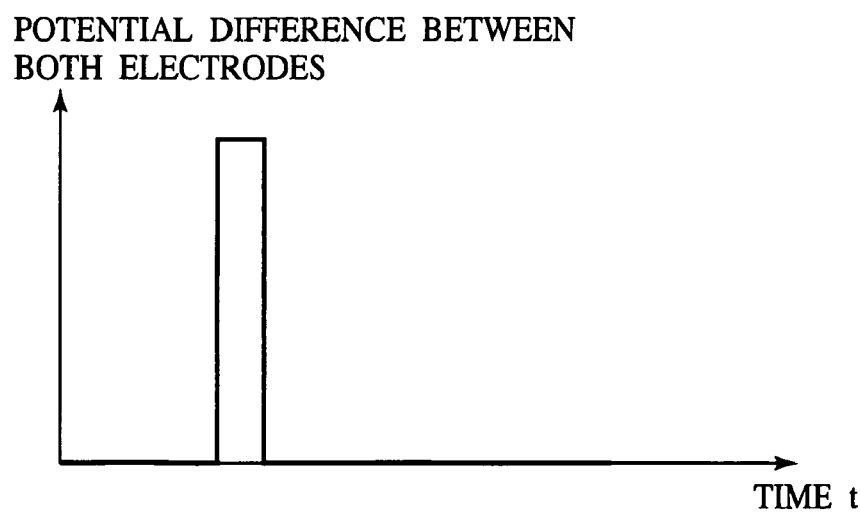

Then, due to a potential increase of the other electrode to which the voltage signal of the delayed phase has been next applied, the potential difference between the electrodes is abruptly decreased. That is, the voltage is applied to the liquid crystal layer for a period of time corresponding to the phase difference of the voltage signals applied between the electrodes, and then, the voltage between the electrodes is abruptly removed. FIG. 2B shows the transient changes of the potential difference between the electrodes given when the voltage signals of FIG. 2A are applied to the respective electrodes.

By applying a voltage between the electrodes as described above, the chiral nematic liquid crystal is changed to the planer state or the focal conic state. The change to the planer state or to the focal conic state can be, controlled by a voltage value or a waveform of the voltage signal produced by the piezoelectric element.

For example, when a voltage signal of a large voltage value is produced by the piezoelectric element, a high voltage is applied between the electrodes and abruptly removed, whereby the chiral nematic liquid crystal of the liquid crystal layer becomes the planer state.

Thus, even in the case that the piezoelectric element is used as the electric power source, the voltage between the electrodes can be abruptly removed, whereby the chiral nematic liquid crystal can be controlled to change to the planer state or to the focal conic state. The reflective display device using chiral nematic liquid crystal can be accordingly inexpensively constituted.

(A First Embodiment)

Figure 3:
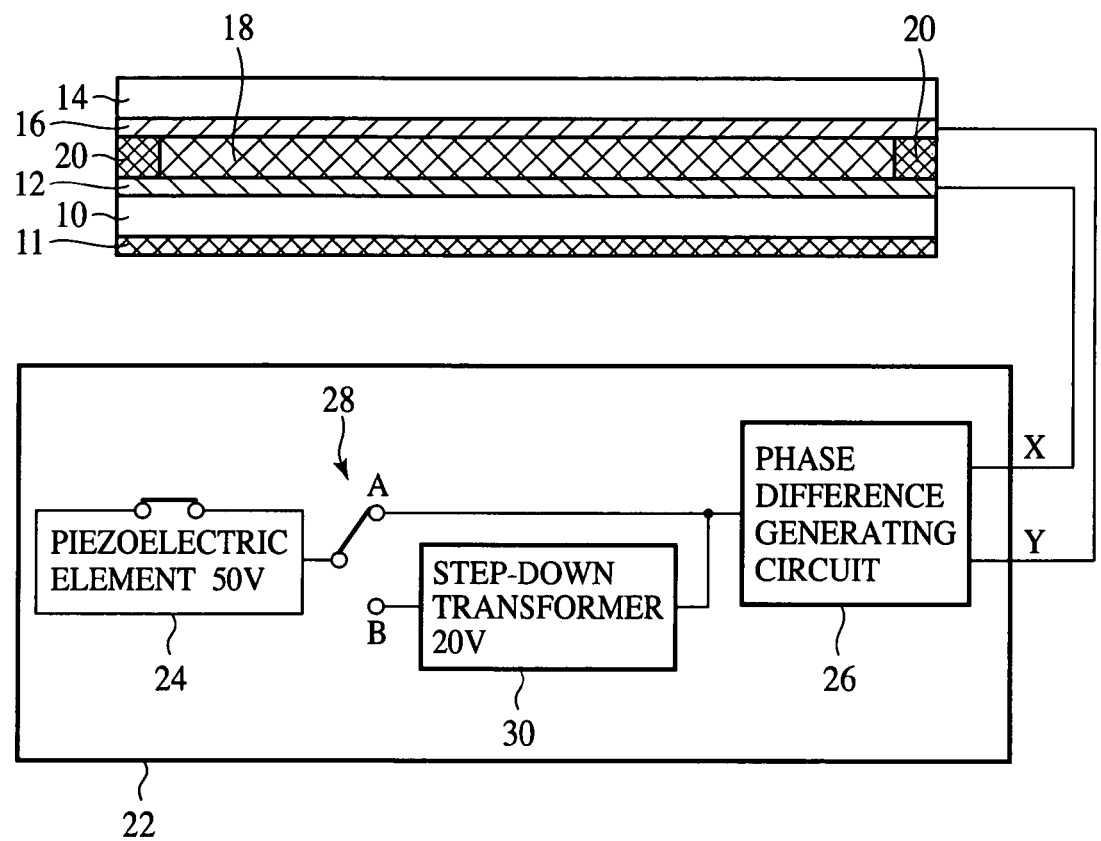
FIG. 3 is a diagrammatic view of the structure of the display device according to a first embodiment of the present invention.

The display device and the method for driving the display device according to a first embodiment of the present invention will be explained with reference to FIGS. 3 and 4. FIG. 3 is a diagrammatic view of the display device according to the present embodiment, which shows the structure thereof. FIG. 4 is views explaining the method for driving the display device according to the present embodiment.

First, the display device according to the present embodiment will be explained with reference to FIG. 3.

As shown in FIG. 3, an electrode 12 of ITO is formed on a substrate 10 of glass. A photoabsorbing layer 11 is formed on the back side of the substrate 10.

A substrate 14 of glass is disposed above the substrate 10 with the electrode 12 formed on, opposed to the substrate 10. An electrode 16 of ITO is formed on the surface of the substrate 14, which is opposed to the electrode 12.

A liquid crystal layer 18 of chiral nematic liquid crystal is formed between the opposed substrates 10, 14. The liquid crystal layer 18 is sealed with a seal compound 20 for preventing the liquid crystal leakage of the liquid crystal layer 18 at the outer periphery between the substrates 10, 14.

The chiral nematic liquid crystal of the liquid crystal layer 18 is formed by adding a chiral reagent to as nematic liquid crystal. As the nematic liquid crystal, E48 (tradename, by Merck), for example, can be used. As the chiral reagent, CB15 (tradename, by Merck), for example, which induces the liquid crystal molecules to twist to the right, can be used. The thickness of the liquid crystal layer 18 can be, e.g., 5 µm. The wavelength of the selective reflection by the chiral nematic liquid crystal can be suitably set by adjusting the amount of the chiral reagent to be added to the nematic liquid crystal.

The respective electrodes 12, 16 are connected to an electric power source unit 22 for applying a voltage between the electrodes 12, 16.

The electric power source unit 22 comprises a piezoelectric element 24 for producing a voltage signal which abruptly increases up to a prescribed voltage value and then gradually attenuates, and a phase difference generating circuit 26 which divides a voltage signal from the piezoelectric element 24 into two voltage signals and gives them a phase difference.

The electric power source unit 22 comprises output parts X, Y which respectively output the two voltage signals which, by the phase difference generating circuit 26, the voltage signal produced by the piezoelectric element 24 has been divided into and have been given a phase difference. The output part X is connected to the electrode 12. The output part Y is connected to the electrode 16.

A switch 28 and a step-down transformer 30 are provided between the piezoelectric element 24 and the phase difference generating circuit 26. The switch 28 is connected to the A side to thereby lead a voltage signal produced by the piezoelectric element 24 to the phase difference generating circuit 26 as it is. The switch 28 is connected to the B side to decrease a voltage value of a voltage signal generated by the piezoelectric element 24 by the step-down transformer 30 and lead the voltage signal to the phase difference generating circuit 26.

As described above, one major characteristic of the display device according to the present embodiment is that the display device comprises the phase difference generating circuit 26 which divides a voltage signal produced by the piezoelectric element 24 into two voltage signals, gives them a phase difference and applies the divided voltage signals respectively to the electrodes 12, 16. This characteristic makes it possible to apply a high voltage between the electrodes 12, 16 and abruptly remove the voltage signal applied between the electrodes 12, 16, whereby the chiral nematic liquid crystal of the liquid crystal layer 18 can be changed to the planer state. Accordingly, the reflective display device can be constituted using an inexpensive piezoelectric element as the electric power source.

Next, the method for driving the display device according to the present embodiment will be explained with reference to FIG. 4.

Figure 4A:
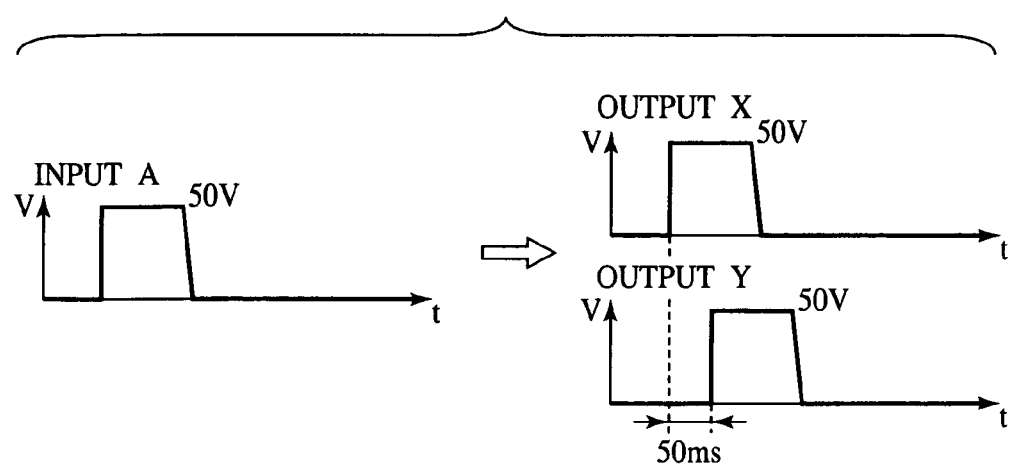
FIGS. 4A and 4B are views explaining the method for driving the display device according to the first embodiment of the present invention.

First, the drive of the display device for turning the chiral nematic liquid crystal of the liquid crystal layer 18 into the planer state so that the liquid crystal layer 18 reflects that of the incident light, which has a specific wavelength will be explained with reference to FIG. 4A. The view on the left side of FIG. 4A is the waveform of the voltage signal to be inputted to the phase difference generating circuit 26 when the switch 28 is connected to the A side. The view on the right side of FIG. 4A is the waveforms of the voltage signals to be outputted respectively from the output parts X, Y of the electric power unit 22.

The switch 28 is connected to the A side, and then the piezoelectric element 24 is driven to thereby generate a voltage signal which abruptly increases up to a prescribed voltage value and then gradually attenuates. A voltage value of the voltage signal can be, e.g., 50 V.

The voltage signal produced by the piezoelectric element 24 is inputted to the phase difference generating circuit 26 as it is (see the view on the left side of FIG. 4A).

Then, the inputted voltage signal is divided in two voltage signals by the phase difference generating circuit 26. At this time, a phase difference is given to the two divided voltage signals. A phase difference to be given to the two voltage signals can be, e.g., 50 ms. The two voltage signals into which the voltage signal has been divided and have been given the phase difference are outputted respectively from the output parts X, Y (see the view on the right side of FIG. 4A).

Next, the voltage signals outputted from the output parts X, Y are applied respectively to the electrodes 12, 16. The voltage signals applied respectively to the electrodes 12, 16 are equivalent to a voltage of a rectangular weveform applied between the electrodes 12, 16. That is, a high voltage is applied and then, the voltage is abruptly removed. For example, when a voltage value of a voltage signal produced by the piezoelectric element 14 is 50 V, and a phase difference to be given by the phase difference generating circuit 26 is 50 ms, a voltage of the rectangular waveform of a 50 V voltage value and a 50 ms pulse width is applied between the electrodes 12, 16.

Thus, the voltage of the rectangular waveform applied between the electrodes 12, 16 permits the chiral nematic liquid crystal of the liquid crystal layer 18 to become the planer state. Thus, the liquid crystal layer 18 reflects selectively that of the incident light, which has a specific wavelength corresponding to a helical pitch of the liquid crystal molecules.

In this way, the display device can be driven to reflect that of the incident light, which has a specific wavelength.

Figure 4B:
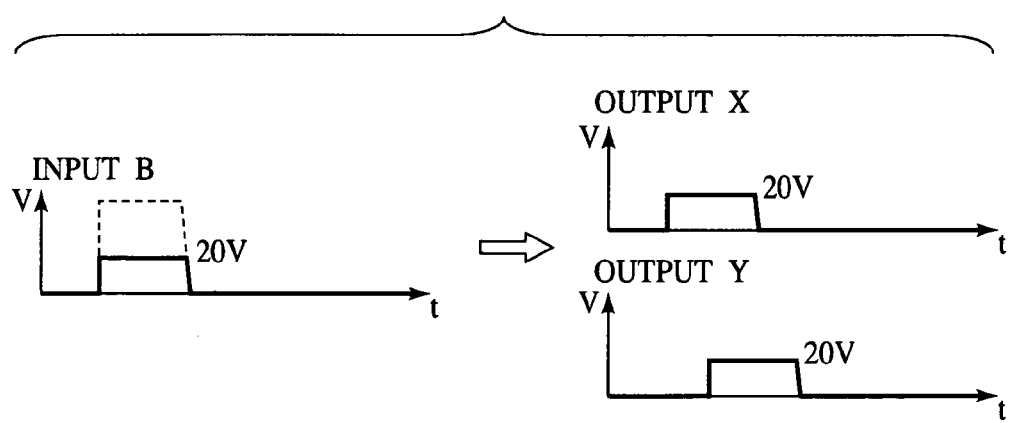

Then, the drive of the display device for turning the chiral nematic liquid crystal of the liquid crystal layer 18 into the focal conic state so that the liquid crystal layer 18 transmits the incident light as it is will be explained with reference to FIG. 4B. The view on the left side of FIG. 4B is the waveform of a voltage signal to be inputted to the phase difference generating circuit 26 when the switch 28 is connected to the B side. The view on the right side of FIG.

4B is the waveforms of the voltage signals to be outputted respectively from the output parts X, Y of the electric power unit 22.

The switch 28 is connected to the B side, and then the piezoelectric element 24 is driven to thereby produce the voltage signal, as the voltage signal produced by connecting the piezoelectric element 24 to the A side. A voltage value of the voltage signal can be, e.g., 50 V.

The voltage signal produced by the piezoelectric element 24 is inputted to the step-down transformer 30 to be decreased to a prescribed voltage value. For example, a 50 V voltage signal produced by the piezoelectric element 24 is decreased to 20 V.

The voltage signal which has been decreased by the step-down transformer 30 is inputted to the phase difference generating circuit 26 (see the view on the left side of the FIG. 4B).

Next, in the same way as in connecting the switch 28 to the A side, the inputted voltage signal is divided into two voltage signals by the phase difference generating circuit 26. At this time a phase difference is given to the two divided voltage signals. A phase difference to be given to the two voltage signals can be, e.g., 50 ms. The two voltage signals into which the voltage signal has been divided and have been given the phase difference are outputted respectively from the output parts X, Y (see the view on the right side of FIG. 4B).

Next, the two voltage signals outputted from the output parts X, Y are applied respectively to the electrodes 12. 16. The application of the voltage signals respectively applied to the two electrodes is equivalent to the application of a rectangular waveform voltage between the electrodes 12, 16. For example, when a voltage signal produced by the piezoelectric element 14 is 50 V, the voltage value is decreased to 20 V by the step-down transformer 30, and a phase difference to be given by the phase difference generating circuit 26 is 50 ms, a rectangular waveform voltage of a 20 V voltage value and a 50 ms-pulse width is equivalently applied. That is, connecting the switch to the B side is equivalent to applying between the electrodes 12, 16 a rectangular waveform voltage of a smaller voltage value than in connecting the switch to the A side.

The rectangular waveform voltage signal of a smaller voltage value than in connecting the switch to the A side, which has been applied between the electrodes 12, 16 turns the chiral nematic liquid crystal of the liquid crystal layer 18 into the focal conic structure. Thus, the incident light is transmitted by the liquid crystal layer 18 to be absorbed by the photoabsorbing layer 11.

The display device is thus driven to transmit the incident light as it is.

As described above, the switch 28 is changed over, whereby a rectangular waveform of a larger voltage value or a rectangular waveform of a smaller voltage value can be applied between the electrodes 12, 16. Accordingly, the chiral nematic liquid crystal of the liquid crystal layer 18 can be turned into the planer state or the focal conic state. Resultantly, the state in which the liquid crystal layer 18 reflects that of the incident light, having a specific wavelength and the state in which the liquid crystal layer 18 can transmit the incident light can be changed over, and the display device can be driven in the mode of the non-emissive reflective.

As described above, according to the present embodiment, a voltage signal produced by the piezoelectric element 14 is divided into two voltage signals, and a phase difference is given to them, and the voltages are applied respectively to the electrodes 12, 16, whereby the state which is equivalent to the state formed by applying a high voltage between the electrodes 12, 16 and abruptly removing the voltage can be generated, and the chiral nematic liquid crystal of the liquid crystal layer 18 can be turned into the planer state. The voltage value of a voltage signal produced by the piezoelectric element 14 is decreased, whereby the chiral nematic liquid crystal is turned into the focal conic state. The reflective display device using the piezoelectric element 24 as the electric power source for applying a voltage between the electrodes 12, 16 and using chiral nematic liquid crystal can be constituted inexpensive, and can be simply driven.

In the present embodiment, a voltage signal of a large voltage value is produced by the piezoelectric element 24, and to turn the chiral nematic liquid crystal into the focal conic state, the voltage signal is decreased by the step-down transformer 20 to be inputted to the phase difference generating circuit 26, but the opposite is also applicable. That is, a voltage signal of a small voltage value is produced by the piezoelectric element 24, and when the chiral nematic liquid crystal is to be turned into the focal conic state, the voltage signal is inputted to the phase difference generating circuit 26 as it is. On the other hand, when the chiral nematic liquid crystal is turned into the planer state, the voltage signal of the small voltage value produced by the piezoelectric element 24 is increased by a step-up transformer to be inputted to the phase difference generating circuit 26.

In the present embodiment, the case of applying a higher voltage between the electrodes 12, 16, and the case of applying a lower voltage between the electrodes 12, 16 have been explained, but this is not essential. For example, it is possible that a voltage value of a voltage signal produced by a piezoelectric element 24 is made suitably adjustable to thereby suitably adjust a value of a voltage to be applied between the electrodes 12. 16. This permits the chiral nematic liquid crystal to be turned into a state mixing the planer state and the focal conic state, and displays of halftone can be made.

(A Second Embodiment)

Figure 5:
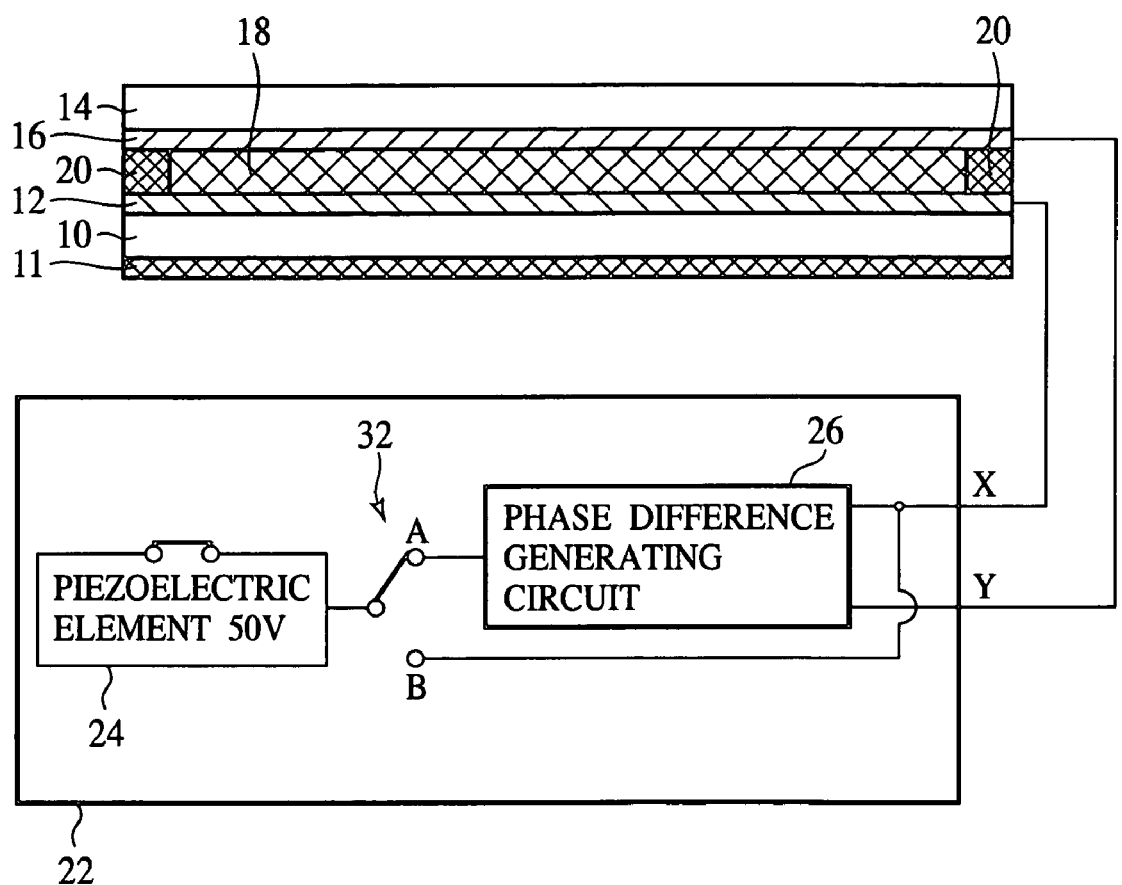
FIG. 5 is a diagrammatic view of the structure of the display device according to a second embodiment of the present invention.

The display device and the method for driving the display device according to a second embodiment of the present invention will be explained with reference to FIGS. 5 and 6. FIG. 5 is a diagrammatic view of the display device according to the present embodiment, which shows the structure thereof. FIG. 6 is views explaining the method for driving the display device according to the present embodiment. The same members of the present embodiment as those of the display device and the method for driving the display device according to the first embodiment are represented by the same reference numbers not to repeat or to simplify their explanation.

In the first embodiment, a voltage signal has the value changed to apply voltage signals of different voltage values respectively to the electrodes 12, 16, whereby the orientation states of the chiral nematic liquid crystal of the liquid crystal layer 18 are controlled. However, the display device and the method for driving the display device according to the present embodiment is characterized mainly in that a voltage signal has the waveform changed to be applied to electrodes 12, 16, whereby orientation states of the chiral nematic liquid crystal of a liquid crystal layer 18 are changed.

An electric power source unit 22 comprises a piezoelectric element 24 which produces a voltage signal, and a phase difference generating circuit 26 which divides a voltage signal produced by the peizoelectric device 24 and gives them a phase difference. A switch 32 is provided between the piezoelectric element 24 and the phase difference generating circuit 26. The switch 32 is connected to an A side, whereby a voltage signal produced by the piezoelectric element 24 is divided into two voltage signals, and the two voltage signals are given a phase difference, by the phase difference generating circuit 26, and the two voltage signals are outputted from output parts X, Y, respectively. The switch 32 is connected to a B side, whereby a voltage signal produced by the piezoelectric element 24 is outputted as it is from the output part X to be applied to one 12 of the electrodes.

Then, the method for driving the display device according to the present embodiment will be explained with reference to FIG. 6.

Figure 6A:
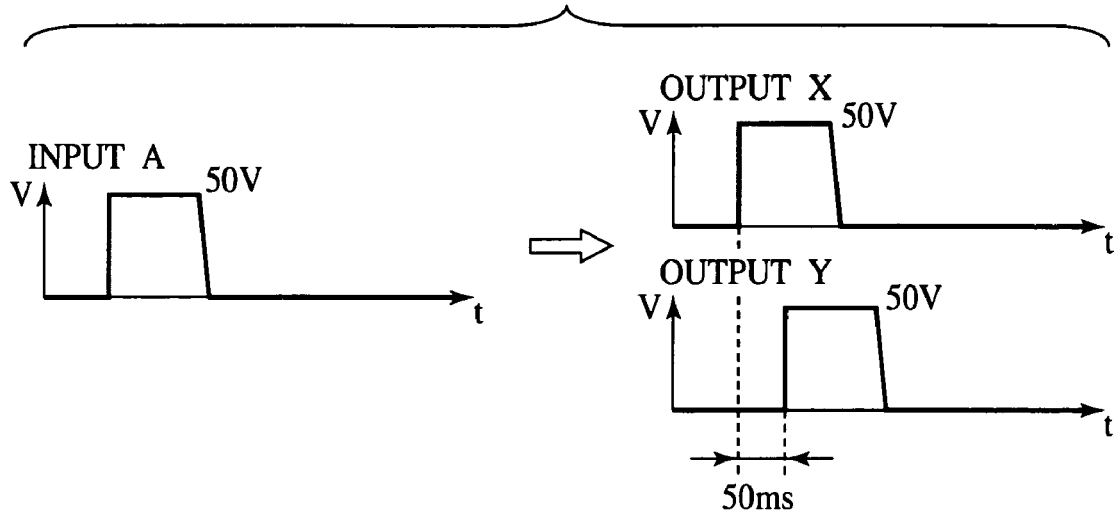
FIGS. 6A and 6B are views explaining the method for driving the display device according to the second embodiment of the present invention.

First, the drive of the display device, in which the chiral nematic liquid crystal of the liquid crystal layer 18 is turned into the planer state so that the liquid crystal layer 18 reflects that of the incident light, which has a specific wavelength, will be explained with reference to FIG. 6A. The view on the left side of FIG. 6A shows the waveform of a voltage signal to be inputted to the phase difference generating circuit 26 when the switch 32 is connected to the A side. The view on the right side of FIG. 6A shows the waveforms of voltage signals to be outputted respectively from the output parts X, Y of the phase difference generating circuit 26.

First, the switch 32 is connected to the side A, and then a prescribed voltage signal is produced by the piezoelectric element 24. A voltage value of the voltage signal can be, e.g., 50 V.

The voltage signal produced by the piezoelectric element 24 is inputted to the phase difference generating circuit 26 as it is (see the left view of FIG. 6A).

Then, in the same was as in the first embodiment, the voltage signal is divided into two voltage signals, and a phase difference is given to the two voltage signals, by the phase difference generating circuit 26, and the two voltage signals given the phase difference are applied respectively to the electrodes 12, 16 (see the right view of FIG. 6A). Thus, the chiral nematic liquid crystal of the liquid crystal layer 18 is turned into the planer state. Thus, the liquid crystal layer 18 reflects that of the incident light, which has a specific wavelength corresponding to a helical pitch of the liquid crystal molecules.

The display device is thus driven to reflect that of the incident light, which a specific wavelength.

Figure 6B:
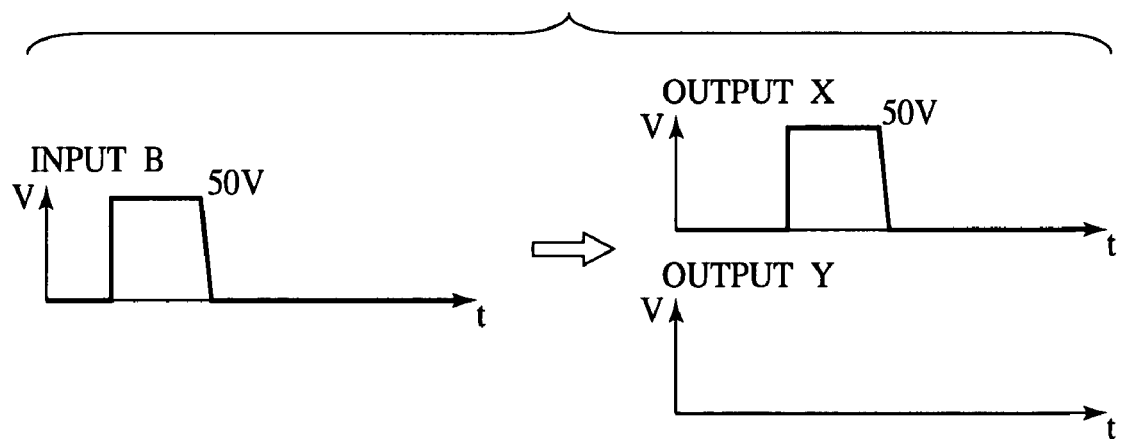

Next, the drive of the display device, in which the chiral nematic liquid crystal of the liquid crystal layer 18 is turned into the focal conic state so that the liquid crystal layer 18 transmits the incident light as it is, will be explained with reference to FIG. 6B. The view on the left side of FIG. 6B is the view of the waveform of a voltage signal to be inputted to the phase difference generating circuit 26 when the switch 32 is connected to the B side. The view on the right side of FIG. 6B is views of the waveforms of the voltage signals outputted respectively from the output parts X, Y of the phase difference generating circuit 26.

The switch 32 is connected to the B side, and then a prescribed voltage signal is produced by the piezoelectric element 24. A voltage value of the voltage signal can be, e.g., 50 V.

A voltage signal produced by the piezoelectric element 24 is outputted from the output part X of the electric source unit 22 to be applied to the electrode 12 as it is. On the other hand, the voltage signal is not applied to the electrode 16 (see the right view of FIG. 6B).

In this case, a voltage signal is applied only to one 12 of the electrodes by using the piezoelectric element 24. Consequently, as described in the principle of the present invention, although a high voltage can be applied between the electrodes 12, 16, the applied voltage between the electrodes 12, 16 cannot be abruptly removed. Accordingly, the chiral nematic liquid crystal of the liquid crystal layer 18 is turned into the focal conic state. Thus, the incident light is transmitted by the liquid crystal layer 18 to be absorbed by the photoabsorbing layer 11.

Thus, the display device is driven to transmit the incident light as it is.

As described above, according to the present embodiment, a voltage signal produced by the piezoelectric element 24 is divided into two voltage signals, a phase difference is given to them, and the two voltage signals are applied respectively to the electrodes 12, 16, whereby the state equivalent to that formed by applying a high voltage between the electrodes 12, 16 and then abruptly removing the voltage can be generated, whereby the chiral nematic liquid crystal of the liquid crystal layer 18 can be turned into the planer state. A voltage signal produced by the piezoelectric element 24 is simply applied to one electrode 12, whereby the chiral nematic liquid crystal can be turned into the focal conic state. The reflective display device using the piezoelectric element 24 as the electric power source for applying a voltage between the electrodes 12, 16 and using chiral nematic liquid crystal can be constituted inexpensive, and can be simply driven.

(A Third Embodiment)

Figure 7:
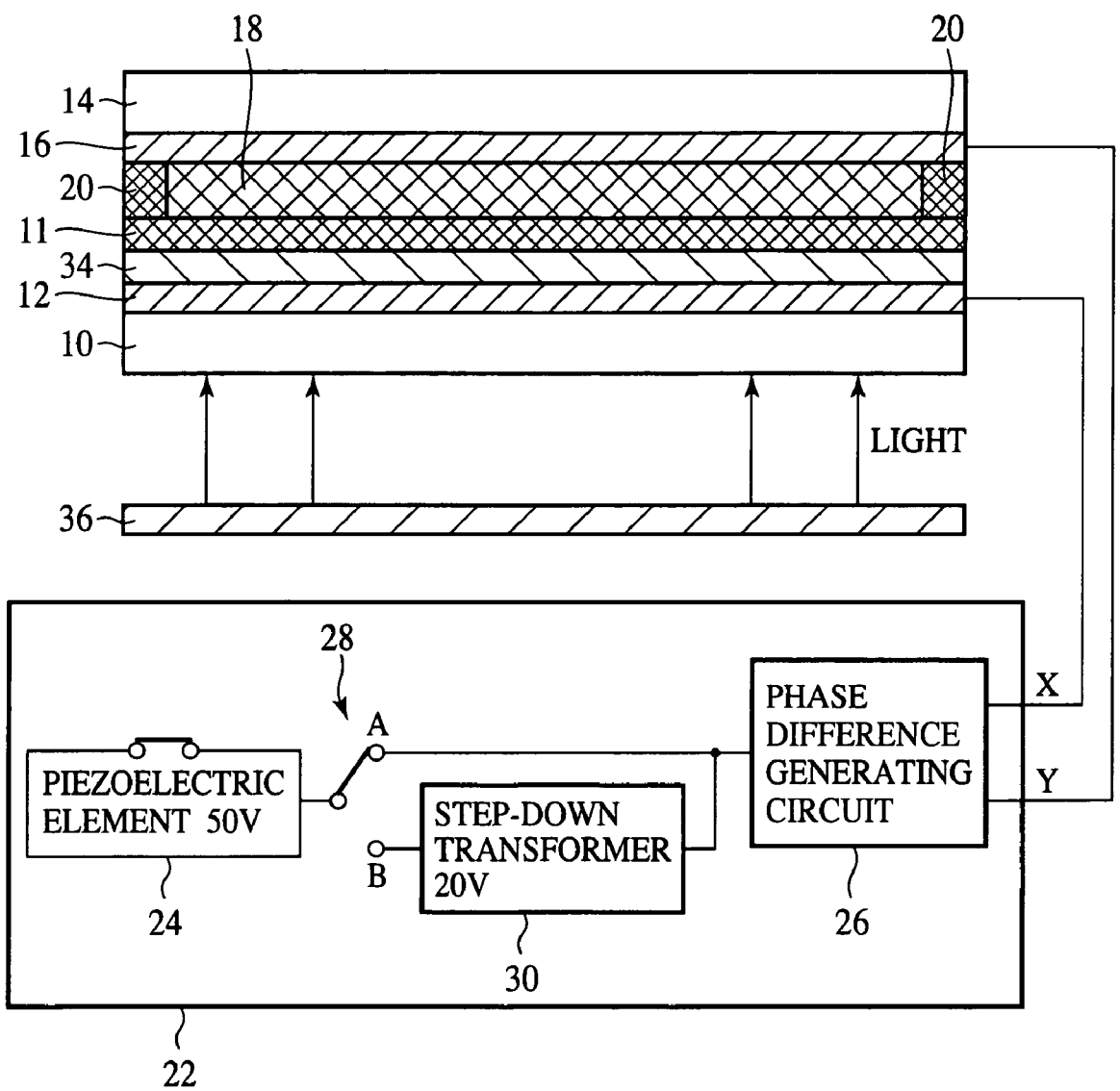
FIG. 7 is a diagrammatic view of the structure of the display device according to a third embodiment of the present invention.

The display device and method for driving the display device according to a third embodiment of the present invention will be explained with reference to FIGS. 7 and 8. FIG. 7 is a diagrammatic view of the display device according to the present embodiment, which shows the structure thereof. FIG. 8 is diagrammatic views of the states of the photoconductor layer before and after the application of light to the photoconductor layer. The same members of the present embodiment as those of the display device according to the first embodiment are represented by the same reference numbers not to repeat or to simplify their explanation.

First the display device according to the present embodiment will be explained with reference to FIG. 7. The display device according to the present embodiment is the display device according to the first embodiment combined with a photowriting system.

As shown in FIG. 7, an electrode 12 of ITO is formed on a substrate 10 of glass. A photoconductor layer 34 of amorphous silicon, which changes conductivity depending on the absence or presence of light application, is formed on the electrode 12.

A photoabsorbing layer 11 is formed on the photoconductor layer 34.

A substrate 14 of glass is disposed above the side of the substrate 10 with the photoconductor layer 34, etc. formed on, opposed to the substrate 10. An electrode 16 is formed on the side of the substrate 14, which is opposed to the photoconductor layer 34.

A liquid crystal layer 18 of the chiral nematic liquid crystal is formed between the substrates 10, 14 opposed each other. The liquid crystal layer 18 is sealed with a seal compound 20 for preventing the liquid crystal leakage, at the outer periphery between the substrates 10, 14.

A light modulator 36 which can apply light to the photoconductor layer 34 at a prescribed position is provided on the back side of the substrate 10 with the photoconductor layer 34 formed on.

The electrodes 12, 16 formed respectively on the substrates 10, 14 are connected to an electric power source unit 22, as in the first embodiment.

The display device according to the present embodiment is characterized mainly by further comprising the photoconductor layer 34 formed on the electrode 12, and the light modulator 36 which can apply light to the photoconductor layer 34 at a prescribed position, which are added to the constitution of the display device according to the first embodiment.

The photoconductor layer 34 of amorphous silicon becomes electrically conductive by the application of light.

Figure 8A:
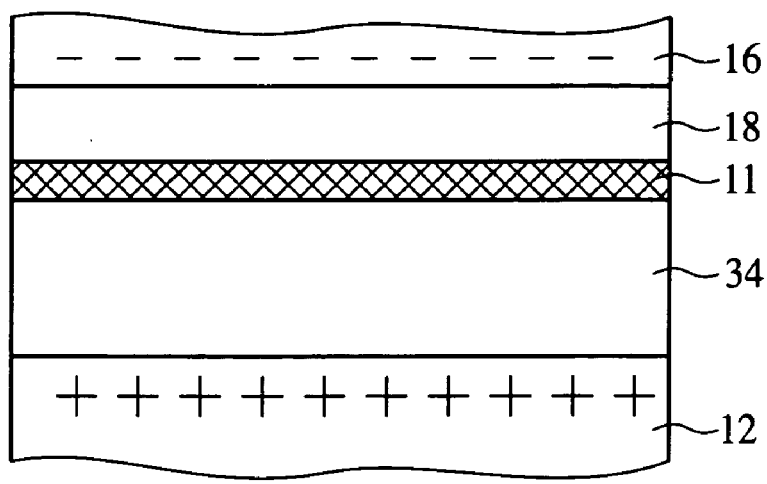
FIGS. 8A and 8B are diagrammatic views of the states of the photoconductor layer in the display device according to the third embodiment before and after the application of light to the photoconductor layer.

As shown in FIG. 8A, before light is applied to the photoconductor layer 34, the photoconductor layer 34 is not charged and has a high electric resistance. Accordingly, the strength of the electric fields formed in the liquid crystal layer 18 is very low.

Figure 8B:
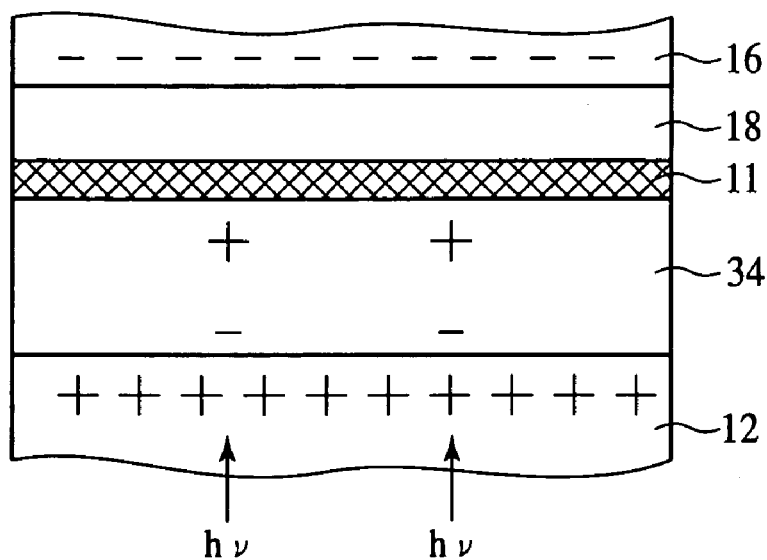
Figure 9:
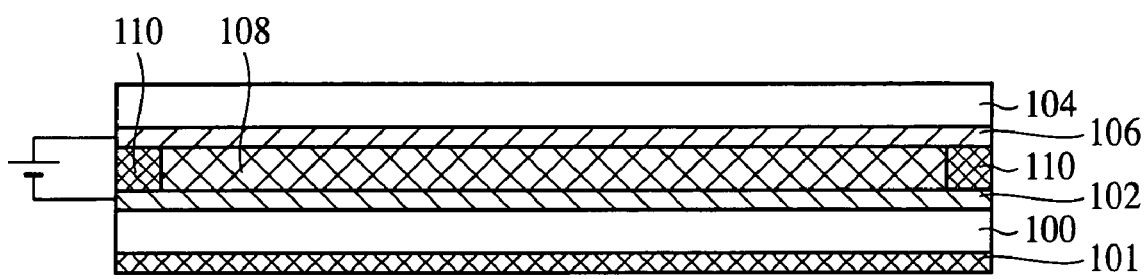
FIG. 9 is a diagrammatic view of the structure of a display device using chiral nematic liquid crystal.
Figure 10A:
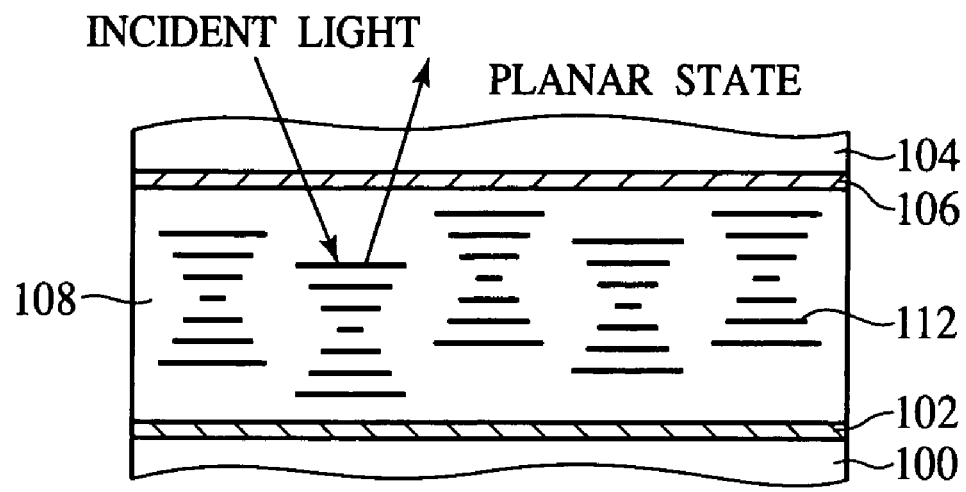
FIGS. 10A and 10B are diagrammatic views of orientation states of chiral nematic liquid crystal.
Figure 10B:
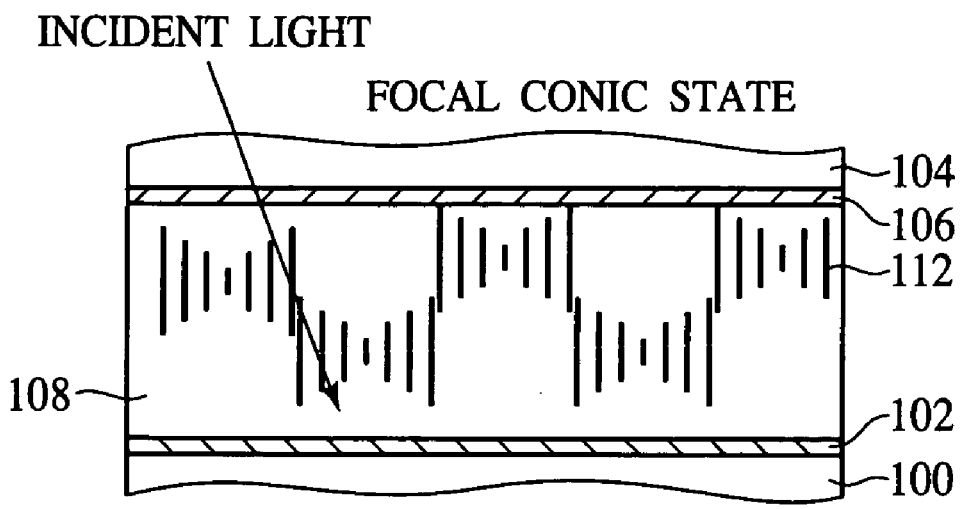
Figure 11A:
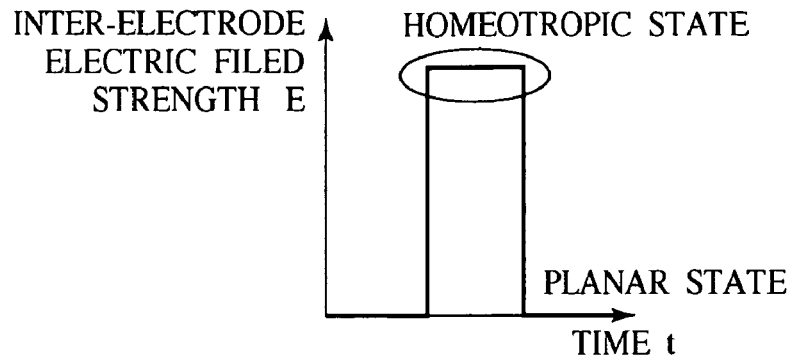
FIGS. 11A, 11B and 11C are views explaining the method for driving the conventional display device using chiral nematic liquid crystal.
Figure 11B:
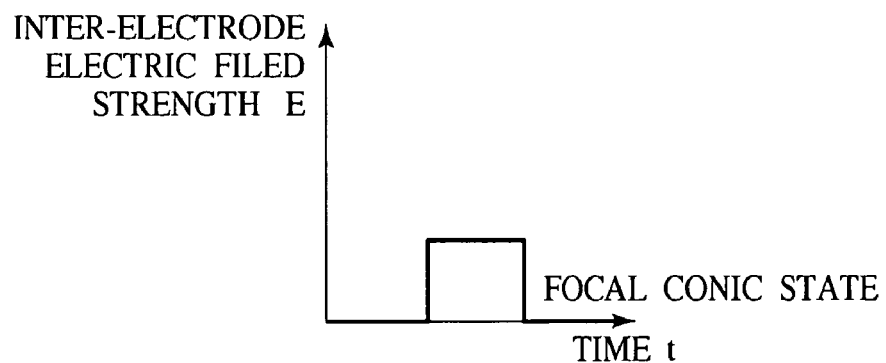
Figure 11C:
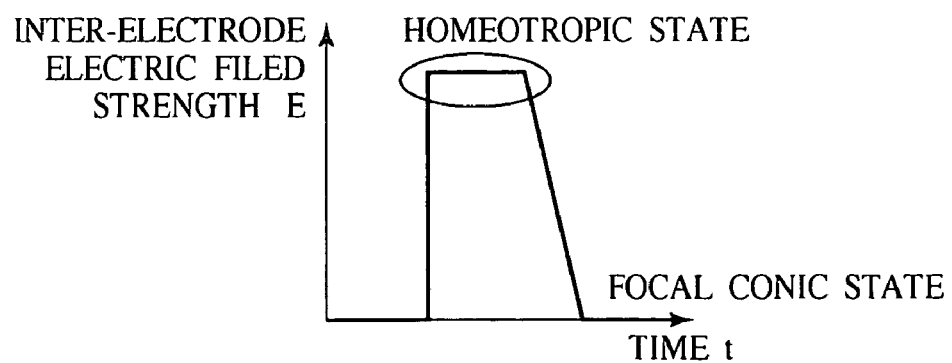

On the other hand, as shown in FIG. 8B, when light is applied by the photomodulator 36 to the photoconductor layer 34 at a prescribed position, the photoconductor layer 34 is charged at the position to which the light has been applied, and the electric resistance is decreased. Accordingly, in this state, when a voltage is applied between the electrodes 12, 16 by the method for driving the display device according to the first embodiment, a strong electric field can be formed in the liquid crystal only at the prescribed position. Thus, the orientation state of the chiral nematic liquid crystal of the liquid crystal layer 18 at the prescribed position can be changed.

Then, the method for driving the display device according to the present embodiment will be explained with reference to FIG. 7.

First, the drive of the display device, in which the chiral nematic liquid crystal of the liquid crystal layer 18 at a prescribed position is turned into the planer state so that the display device displays a prescribed image, will be explained. In the initial state of the display device, the chiral nematic liquid crystal of the liquid crystal layer 18 may be the planer state or the focal conic state.

First, light is applied to the photoconductor layer 34 at a prescribed position by the photomodulator 36. The photoconductor layer 34 becomes conductive at the positions light has been applied to.

Then, in the same way as in the first embodiment, two voltage signals of high voltage values having a phase difference are applied respectively to the electrodes 12, 16. As drive conditions, for example, a voltage value of the voltage signal produced by the piezoelectric element 24 can be 120 V, and a phase difference to be given to two voltage signals divided by the phase difference generating circuit 26 can be 100 ms.

Thus, the chiral nematic liquid crystal positioned above the part of photoconductor layer 34 to which the light has been applied becomes a state equivalent to the state generated by forming a strong electric field and abruptly removing the electric field. Accordingly, the chiral nematic liquid crystal positioned above the part of photoconductor layer 34 to which the light has been applied becomes the planer state and reflects light of a specific wavelength corresponding to a helical pitch of the liquid crystal molecules.

On the other hand, the state of the chiral nematic liquid crystal positioned above the part of photoconductor layer 34 to which the light has not been applied becomes the focal conic state due to a weak electric field. Accordingly, the chiral nematic liquid crystal positioned above the part of photoconductor layer 34 to which the light has been applied transmits the incident light.

The chiral nematic liquid crystal of the liquid crystal layer 18 at the prescribed position is thus turned into the reflective state, whereby an image corresponding to the position light has been applied to by the photomodulator 36 can be displayed.

The chiral nematic liquid crystal positioned above the part of photoconductor layer 34 to which the light has been applied can be also turned into the focal conic state.

In this case, in the same way as in the first embodiment, voltage signals of low voltage values having a phase difference are respectively applied to the electrodes 12, 16. As drive conditions, for example, the voltage value of a 120 V voltage signal produced by the piezoelectric element 24 is decreased to 50 V by the step-down transformer 30, and a phase difference to be given to the two voltage signals generated by the phase difference generating circuit 26 can be 100 ms.

On the other hand, the state of the chiral nematic liquid crystal positioned above the part of photoconductor layer 34 to which the light has not been applied has a very weak electric field, and is not changed.

Thus, the liquid crystal layer 18 has the additional part which transmits the incident light as it is, and a new image is displayed in addition to the image displayed previously.

In order to erase the displayed image, light is applied to the entire surface of the photoconductor layer 34, and then a 120 V voltage is applied in the same way. The entire chiral nematic liquid crystal of the liquid crystal layer 18 is turned into the planer state, and the displayed image is erased.

As described above, according to the present embodiment, a voltage signal produced by the piezoelectric element 24 is divided into two voltage signals, a phase difference is given them, and the two voltage signals are applied respectively to the electrodes 12, 16 via the photoconductor layer 34 a prescribed position of which light has been applied to, whereby the chiral nematic liquid crystal positioned above the part of photoconductor layer 34 to which the light has been applied can be turned into the planer state, and images, etc. can be displayed at once.

In the present embodiment, the material of the photoconductor layer 34 is amorphous silicon but is not essentially limited to amorphous silicon. As the material of the photoconductor layer 34, for example, OPC (Organic PhotoConductor) used as a sensitizer of laser printers, etc. can be used.

In the present embodiment, voltage signals are applied to the electrodes 12, 16 in the same way as in the first embodiment but can be applied to the electrodes 12, 16 in the same way as in the second embodiment.

(Modified Embodiments)

The present invention is not limited to the above-described embodiments and can cover other various modifications.

For example, in the above-described embodiments, the display device includes the liquid crystal layer of the chiral nematic liquid crystal, but such liquid crystal layer is not essential. As a liquid crystal forming the liquid crystal layer, for example, a liquid crystal forming a cholesteric phase may be used.

In the above-described embodiments, the display device includes the liquid crystal layer of the chiral nematic liquid crystal, but such liquid crystal layer is not essential. The present invention is applicable to any display device as long as the display device includes a display layer which changes a display state corresponding to voltages applied between the electrodes.

In the above-described embodiments, the substrates 10, 14 are formed of glass. The material of the substrates 10, 14 are not essentially limited to glass and can be any material as long as the material has light transmission. Materials of the substrates 10, 14 can be also a resin, e.g., polyethylene terephthalate or others. The display device can be flexible and usable in wide applications.

In the above-described embodiments, the electrodes 12, 16 are formed of ITO. However, the material of the electrodes 12, 16 is not essentially limited to ITO and can be any as long as the material has light transmission.

In the above-described embodiments, a voltage signal is produced by one piezoelectric element 24, the voltage signal is divided into two voltage signals and given a phase difference by the phase difference generating circuit 26, and then the voltage signals are applied respectively to the electrodes 12, 16. However, it is possible that piezoelectric elements are connected respectively to the electrodes 12, 16, and voltage signals having a phase difference are applied.

INDUSTRIAL APPLICABILITY

The display device and method for driving the display device according to the present invention are useful for the cost reduction and electric power consumption reduction of the display devices of computers, mobile devices, etc. using liquid crystals forming cholesteric phase.

The invention claimed is:

1. A display device comprising a first electrode, a second electrode, and a display layer which is formed between the first electrode and the second electrode and changes a display state corresponding to a voltage applied between the first electrode and the second electrode, the display device further comprising:
   a voltage signal producer for producing a drive voltage signal which abruptly increases up to a prescribed voltage value and then gradually attenuates; and
   phase difference generator for outputting a first voltage signal and a second voltage signal having a phase difference from the first voltage signal, based on the drive voltage signal produced by the voltage signal producer,
   the first voltage signal being applied to the first electrode, and the second voltage signal being applied to the second electrode.

2. A display device according to claim 1, wherein the display layer is a liquid crystal layer of a liquid crystal forming a cholesteric phase.

3. A display device according to claim 1, wherein the voltage signal generator is a piezoelectric element.

4. A display device according to claim 1, further comprising
   a voltage adjustor adjusting a voltage value of the drive voltage signal produced by the voltage signal producer.

5. A display device according to claim 1, further comprising
   a photoconductor layer which is formed between the first electrode and the display layer and whose conductivity is changed by the application of light.

6. A display device according to claim 5, wherein a material of the photoconductor layer is amorphous silicon or an organic photoconductor.

7. A method for driving a display device comprising a fist electrode, a second electrode, and a display layer which is formed between the first electrode and the second electrode and changes a display state corresponding to a voltage applied between the first electrode and the second electrode, comprising the steps of:
   producing a drive voltage signal which abruptly increases up to a prescribed voltage value and then gradually attenuates;
   dividing the drive voltage signal to generate a first voltage signal, and a second voltage signal having a phase difference from the first voltage signal; and
   applying the first voltage signal to the first electrode and the second voltage signal to the second electrode.

8. A method for driving a display device according to claim 7, wherein
   the display layer is a liquid crystal layer of a liquid crystal forming a cholesteric phase; and
   a voltage value of the drive voltage signal is controlled to change an orientation state of the liquid crystal forming the cholesteric phase to a planer state or a focal conic state to thereby control a display state of the display layer.

9. A method for driving a display device according to claim 7, wherein
   the drive voltage is produced by a piezoelectric element.

10. A method for driving a display device according to claim 7, wherein
    a photoconductor layer is formed between the first electrode and the display layer,
    light is applied to the photoconductor layer at a prescribed position, and
    a voltage is applied between the first electrode and the second electrode via the photoconductor layer the light has been applied to.

11. A method for driving a display device comprising a first electrode, a second electrode, and a display layer which is formed between the first electrode and the second electrode and changes a display state corresponding to a voltage applied between the first electrode and the second electrode, comprising the steps of:
    producing a drive voltage signal which abruptly increases up to a prescribed voltage value and then gradually attenuates;
    dividing the drive voltage signal to generate a first voltage signal, and a second voltage signal having a phase difference from the first voltage signal, and applying the first voltage signal to the first electrode and the second voltage signal to the second electrode to thereby change the display layer to a first display state; and
    applying the drive voltage signal to the first electrode or the second electrode to thereby change the display layer to a second display state.

12. A method for driving a display device according to claim 11, wherein
    the display layer is a liquid crystal layer of a liquid crystal forming a cholesteric phase; and
    the first voltage signal is applied to the first electrode and the second voltage signal is applied to the second electrode to change an orientation state of the liquid crystal forming the cholesteric phase to a planar state, whereby the display layer is changed to the first display state; and
    the drive voltage signal is applied to the first electrode or the second electrode to change the orientation state of the liquid crystal forming the cholesteric phase to a focal conic state, whereby the display layer is changed to the second display state.

13. A method for driving a display device according to claim 12, wherein
    the drive voltage is produced by a piezoelectric element.

14. A method for driving a display device according to claim 12, wherein
    a photoconductor layer is formed between the first electrode and the display layer,
    light is applied to the photoconductor layer at a prescribed position, and
    a voltage is applied between the first electrode and the second electrode via the photoconductor layer the light has been applied to.

* * * * *